US012487424B2

United States Patent
Kaml et al.

(10) Patent No.: US 12,487,424 B2
(45) Date of Patent: Dec. 2, 2025

(54) FREESTANDING TELECOMMUNICATIONS CABLE GUIDE THAT IS BOTH MOVABLE AND SLIDABLE

(71) Applicant: COMMSCOPE TECHNOLOGIES LLC, Hickory, NC (US)

(72) Inventors: Jonathan R. Kaml, Shakopee, MN (US); Kenneth Allen Skluzacek, Belle Plaine, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 812 days.

(21) Appl. No.: 17/604,134

(22) PCT Filed: Apr. 16, 2020

(86) PCT No.: PCT/US2020/028531
§ 371 (c)(1),
(2) Date: Oct. 15, 2021

(87) PCT Pub. No.: WO2020/214817
PCT Pub. Date: Oct. 22, 2020

(65) Prior Publication Data
US 2022/0229253 A1 Jul. 21, 2022

Related U.S. Application Data

(60) Provisional application No. 62/835,303, filed on Apr. 17, 2019, provisional application No. 62/852,518, filed on May 24, 2019.

(51) Int. Cl.
*G02B 6/44* (2006.01)
(52) U.S. Cl.
CPC ....... *G02B 6/4452* (2013.01); *G02B 6/44526* (2023.05); *G02B 6/44528* (2023.05); *G02B 6/4455* (2013.01)

(58) Field of Classification Search
CPC .. G02B 6/4455; G02B 6/4471; G02B 6/4459; G02B 6/4452; H05K 7/1491
See application file for complete search history.

(56) References Cited

U.S. PATENT DOCUMENTS 4,911,662 A * 3/1990 Debortoli ............. G02B 6/4454
361/829
5,640,481 A * 6/1997 Llewellyn ............ G02B 6/4471
385/134
(Continued)

FOREIGN PATENT DOCUMENTS

CN 104169770 A 11/2014
JP 2014-154879 A 8/2014
(Continued)

OTHER PUBLICATIONS

International Search Report and Written Opinion of the International Searching Authority for International Patent Application No. PCT/US2020/028531 mailed Jul. 30, 2020, 11 pages.

*Primary Examiner* — Andrew Jordan
(74) *Attorney, Agent, or Firm* — Merchant & Gould P.C.

(57) ABSTRACT

A cable guide includes a base for positioning the cable guide on a base surface of an internal area of a telecommunications chassis. The base is generally planar. The cable guide includes a plurality of arms and at least one arm of the plurality of arms is flexible. The cable guide includes a plurality of cable channels that are defined by the plurality of arms. The plurality of cable channels each receive a plurality of furcation tubes. Each of the plurality of cable channels is configured to allow furcation tubes to move within each of the plurality of cable channels. Each cable channel has an open position and a closed position. When in the open position, furcation tubes can be loaded and unloaded into and out of the cable channel. When in the (Continued)

closed position, furcation tubes are restricted from being removed from the cable channel.

12 Claims, 12 Drawing Sheets

(56) References Cited

U.S. PATENT DOCUMENTS

| | | | |
|---|---|---|---|
| 5,649,042 A | 7/1997 | Saito | |
| 5,715,145 A | 2/1998 | Wong et al. | |
| 6,621,692 B1 | 9/2003 | Johnson et al. | |
| 6,738,555 B1* | 5/2004 | Cooke | G02B 6/4471 385/136 |
| 7,270,485 B1* | 9/2007 | Robinson | G02B 6/4471 385/136 |
| 7,494,284 B2* | 2/2009 | Robinson | G02B 6/4477 385/106 |
| 7,613,376 B2* | 11/2009 | Wright | G02B 6/4471 385/134 |
| 8,364,000 B2* | 1/2013 | Gonzalez | G02B 6/4477 385/136 |
| 8,417,074 B2* | 4/2013 | Nhep | G02B 6/4455 385/59 |
| 8,666,216 B2* | 3/2014 | Takisaki | G02B 6/4452 385/115 |
| 8,818,156 B2* | 8/2014 | Nave | G02B 6/4471 385/136 |
| 8,844,883 B2 | 9/2014 | Tsutsumi | |
| 8,891,929 B2* | 11/2014 | Fariello | G02B 6/4455 385/135 |
| 8,958,672 B2* | 2/2015 | Mullaney | G02B 6/4459 385/100 |
| 9,057,861 B2* | 6/2015 | Fleming | H02G 3/045 |
| 9,244,243 B2* | 1/2016 | Mullaney | G02B 6/4471 |
| 9,395,509 B2* | 7/2016 | Petersen | G02B 6/4471 |
| 9,435,975 B2 | 9/2016 | Ott | |
| 9,606,317 B2* | 3/2017 | Grandidge | H01R 13/73 |
| 9,606,318 B2* | 3/2017 | Grandidge | F16L 3/01 |
| 9,632,271 B2* | 4/2017 | Montgelas | F16L 3/2235 |
| 9,791,656 B2* | 10/2017 | Marius Goleret | G02B 6/4466 |
| 9,846,291 B2* | 12/2017 | Montgelas | G02B 6/4453 |
| 9,879,800 B2* | 1/2018 | Grandidge | G02B 6/4471 |
| 10,175,443 B1* | 1/2019 | Masuda | G02B 6/4446 |
| 10,247,886 B2* | 4/2019 | Rudenick | G02B 6/4457 |
| 10,551,586 B2* | 2/2020 | Newbury | G02B 6/4471 |
| 10,705,306 B2* | 7/2020 | Geens | G02B 6/4452 |
| 10,830,959 B2* | 11/2020 | Rudenick | G02B 6/3825 |
| 11,340,416 B2* | 5/2022 | Geens | G02B 6/3897 |
| 11,536,920 B2* | 12/2022 | Kempeneers | G02B 6/3897 |
| 11,656,413 B2* | 5/2023 | Rudenick | G02B 6/3825 385/135 |
| 12,140,812 B2* | 11/2024 | Kaml | G02B 6/4476 |
| 2003/0222034 A1* | 12/2003 | Champion | H05K 7/1491 361/826 |
| 2007/0031099 A1* | 2/2007 | Herzog | G02B 6/4452 385/135 |
| 2008/0138020 A1* | 6/2008 | Robinson | G02B 6/4477 385/106 |
| 2008/0219632 A1* | 9/2008 | Smith | H04Q 1/023 385/135 |
| 2009/0060440 A1* | 3/2009 | Wright | G02B 6/4478 385/135 |
| 2009/0238532 A1* | 9/2009 | Smith | H04Q 1/023 385/135 |
| 2011/0235986 A1* | 9/2011 | Kaml | G02B 6/4453 385/135 |
| 2012/0219262 A1 | 8/2012 | Hendrix et al. | |
| 2012/0294581 A1* | 11/2012 | Takisaki | H02G 3/0608 385/136 |
| 2013/0034334 A1* | 2/2013 | Fariello | H05K 7/1491 248/274.1 |
| 2013/0163944 A1* | 6/2013 | Krampotich | G02B 6/46 385/135 |
| 2014/0233903 A1 | 8/2014 | Valderrabano Berrones et al. | |
| 2014/0270676 A1* | 9/2014 | Ott | G02B 6/3897 385/135 |
| 2015/0036992 A1* | 2/2015 | Fleming | H02G 3/045 174/174 |
| 2015/0260937 A1* | 9/2015 | Mullaney | G02B 6/4459 385/136 |
| 2015/0362691 A1* | 12/2015 | Montgelas | F16L 3/01 29/428 |
| 2015/0362692 A1* | 12/2015 | Grandidge | G02B 6/4452 29/434 |
| 2015/0364876 A1* | 12/2015 | Grandidge | G02B 6/4454 439/544 |
| 2015/0366092 A1* | 12/2015 | Grandidge | F16L 3/01 248/68.1 |
| 2015/0370029 A1* | 12/2015 | Petersen | G02B 6/4471 385/136 |
| 2016/0209615 A1 | 7/2016 | Bakatsias et al. | |
| 2016/0231524 A1* | 8/2016 | Womack | G02B 6/4455 |
| 2016/0327769 A1* | 11/2016 | Krampotich | G02B 6/4446 |
| 2017/0152969 A1* | 6/2017 | Grandidge | F16L 3/01 |
| 2017/0184806 A1* | 6/2017 | Marius Goleret | G02B 6/475 |
| 2017/0199346 A1* | 7/2017 | Montgelas | G02B 6/4452 |
| 2017/0371107 A1* | 12/2017 | Rudenick | G02B 6/3874 |
| 2018/0224621 A1 | 8/2018 | Campbell et al. | |
| 2019/0204524 A1* | 7/2019 | Petersen | G02B 6/4471 |
| 2019/0278039 A1* | 9/2019 | Geens | G02B 6/3897 |
| 2019/0310436 A1* | 10/2019 | Van Der Meulen | G02B 6/38 |
| 2020/0033546 A1* | 1/2020 | Geens | G02B 6/4454 |
| 2020/0081192 A1* | 3/2020 | Rudenick | H01R 13/72 |
| 2020/0292773 A1* | 9/2020 | Kempeneers | G02B 6/3897 |
| 2020/0386966 A1* | 12/2020 | Geens | G02B 6/4452 |
| 2021/0103105 A1* | 4/2021 | Rudenick | G02B 6/3874 |
| 2021/0103112 A1* | 4/2021 | Claes | G02B 6/44528 |
| 2022/0026658 A1* | 1/2022 | Gajek | G02B 6/4471 |
| 2022/0030736 A1* | 1/2022 | Zhelyazkov | H05K 7/1491 |
| 2022/0229253 A1* | 7/2022 | Kaml | G02B 6/4471 |
| 2022/0252812 A1* | 8/2022 | Geens | G02B 6/3897 |
| 2022/0252817 A1* | 8/2022 | Kaml | G02B 6/4476 |
| 2023/0093250 A1* | 3/2023 | Van Baelen | G02B 6/4455 |
| 2023/0111957 A1* | 4/2023 | De Vis | G02B 6/4455 385/135 |

FOREIGN PATENT DOCUMENTS

| | | |
|---|---|---|
| TW | 200925691 A | 6/2009 |
| WO | 2012/168292 A2 | 12/2012 |
| WO | 2020/214813 A1 | 10/2020 |

* cited by examiner

FREESTANDING TELECOMMUNICATIONS CABLE GUIDE THAT IS BOTH MOVABLE AND SLIDABLE

CROSS-REFERENCE TO RELATED APPLICATIONS

This application is a National Stage Application of PCT/US2020/028531, filed on Apr. 16, 2020, which claims the benefit of U.S. patent application Ser. No. 62/835,303, filed on Apr. 17, 2019, and claims the benefit of U.S. patent application Ser. No. 62/852,518, filed on May 24, 2019, the disclosures of which are incorporated herein by reference in their entireties. To the extent appropriate, a claim of priority is made to each of the above disclosed applications.

BACKGROUND

Telecommunications chassis that include trays that are extendable from the chassis are known. As trays are extended from the chassis, fiber optic cables attached to each tray are extended away from the chassis. Therefore, overlength of the attached fiber optic cable must be stored in the chassis to allow for extension of the tray from the chassis. However, as trays are extended from the chassis, the overlength of fiber optic cables within the chassis tend to become tangled with one another. This tangling can lead to poor sliding performance of the trays as the fiber optic cables associated with the extended tray catch on fiber optic cables associated with other trays and components within the chassis. Therefore, improvements are desired.

SUMMARY

The present disclosure relates generally to telecommunications equipment. In one possible configuration, and by non-limiting example, a freestanding cable guide that includes a plurality of flexible arms that define a plurality of cable channels is disclosed.

In one example of the present disclosure, a telecommunications system is disclosed. The telecommunications system includes a cable that includes a plurality of optical fibers. The telecommunications system includes a chassis that has a first internal area and a second internal area. The second internal area has a base surface. The telecommunications system includes a cable guide having a planar base, the planar base disposed on the base surface of the second internal area of the chassis such that the cable guide is freestanding on the base surface. The cable guide movable within the second internal area of the chassis with the planar base slidable along the base surface. The cable guide defines at least one cable channel disposed above the planar base and the cable is positioned, and movable, within the at least one cable channel. The at least one cable channel has an open position, where access to the at least one cable channel is allowed, and a closed position, where access to the at least one cable channel is restricted. The telecommunications system includes a telecommunications component positioned at the first internal area of the chassis. The telecommunications component is attached to the cable and is movably mounted to the chassis between a first position and a second position. When the telecommunications component is moved between the first and second positions, the cable moves within the at least one cable channel of the cable guide.

In another example of the present disclosure, a cable guide is disclosed. The cable guide includes a base for positioning the cable guide on a base surface of an internal area of a telecommunications chassis. The base is generally planar. The cable guide includes a plurality of arms and at least one arm of the plurality of arms is flexible. The cable guide includes a plurality of cable channels that are defined by the plurality of arms. The plurality of cable channels each receive a plurality of furcation tubes. Each of the plurality of cable channels is configured to allow furcation tubes to move within each of the plurality of cable channels. Each cable channel has an open position and a closed position. When in the open position, furcation tubes can be loaded and unloaded into and out of the cable channel. When in the closed position, furcation tubes are restricted from being removed from the cable channel.

In another example of the present disclosure, a method of using telecommunications equipment is disclosed. The method includes opening a cable channel of a cable guide. The method includes loading a plurality of furcation tubes, each containing at least one optical fiber, into the cable guide. The method includes closing the cable channel and positioning the cable guide on a base surface of an internal area of a telecommunications chassis so that the cable guide is free standing. The method includes moving the plurality of furcation tubes within the cable channel by moving a telecommunications component attached to the plurality of furcation tubes.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure is directed to a cable guide. In use, the cable guide can be used in a data center or other location. The cable guide can be positioned within a chassis so as to help organize excess cabling within the chassis to allow for easy sliding of a telecommunications tray slidably attached to the chassis. The cables freely slide within cable channels of the cable guide as components are moved, which reduces the chance of cables catching on one another, thereby increasing the quality of the operation of the sliding tray. The cable guide can be used in other locations relative to other telecommunications equipment.

In one example, the cable guide is free standing within the chassis thus allowing the cable guide to be loaded and unloaded easily during installation or modification to the overall system.

Figure 1:
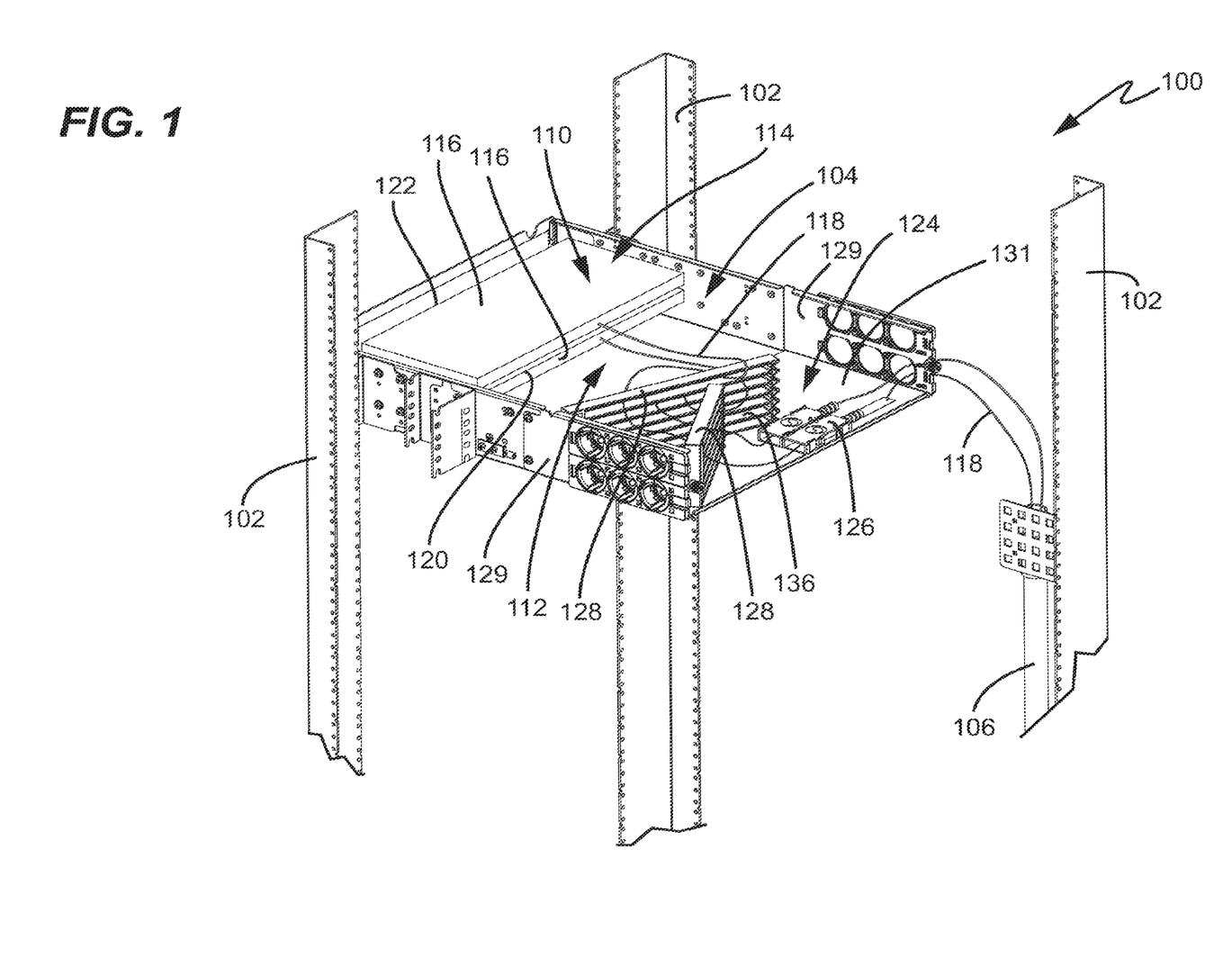
FIG. 1 is a perspective view of a telecommunications environment, according to one example of the present disclosure.

FIG. 1 illustrates an example telecommunications environment 100. As shown, the environment 100 includes a plurality of mounting structures 102 and a chassis 104 mounted to the mounting structures 102. The telecommunications environment 100 can be representative of a variety of different environments. For example, the telecommunications environment 100 is representative of a data center.

The mounting structures 102 are configured to support the chassis 104. In some examples, the telecommunications environment 100 can include a plurality of mounting structures 102 supporting a plurality of chassis 104 and other telecommunications equipment. In some examples, the mounting structures 102 can be integral with another structure, such as a cabinet.

The chassis 104 is configured to house a plurality of telecommunications equipment 110 within an interior 112. At a first internal area 114 of the chassis 104, the chassis 104 includes a plurality of telecommunications components 116 movably mounted thereto. At a second internal area 124 of the chassis 104, furcation tubes 118 of a cable 106 are managed. In some examples, the cable 106 enters the chassis 104 adjacent the second internal area 124. The chassis 104 is depicted as partially dissembled. In some examples, the chassis 104 is enclosed.

Figure 2:
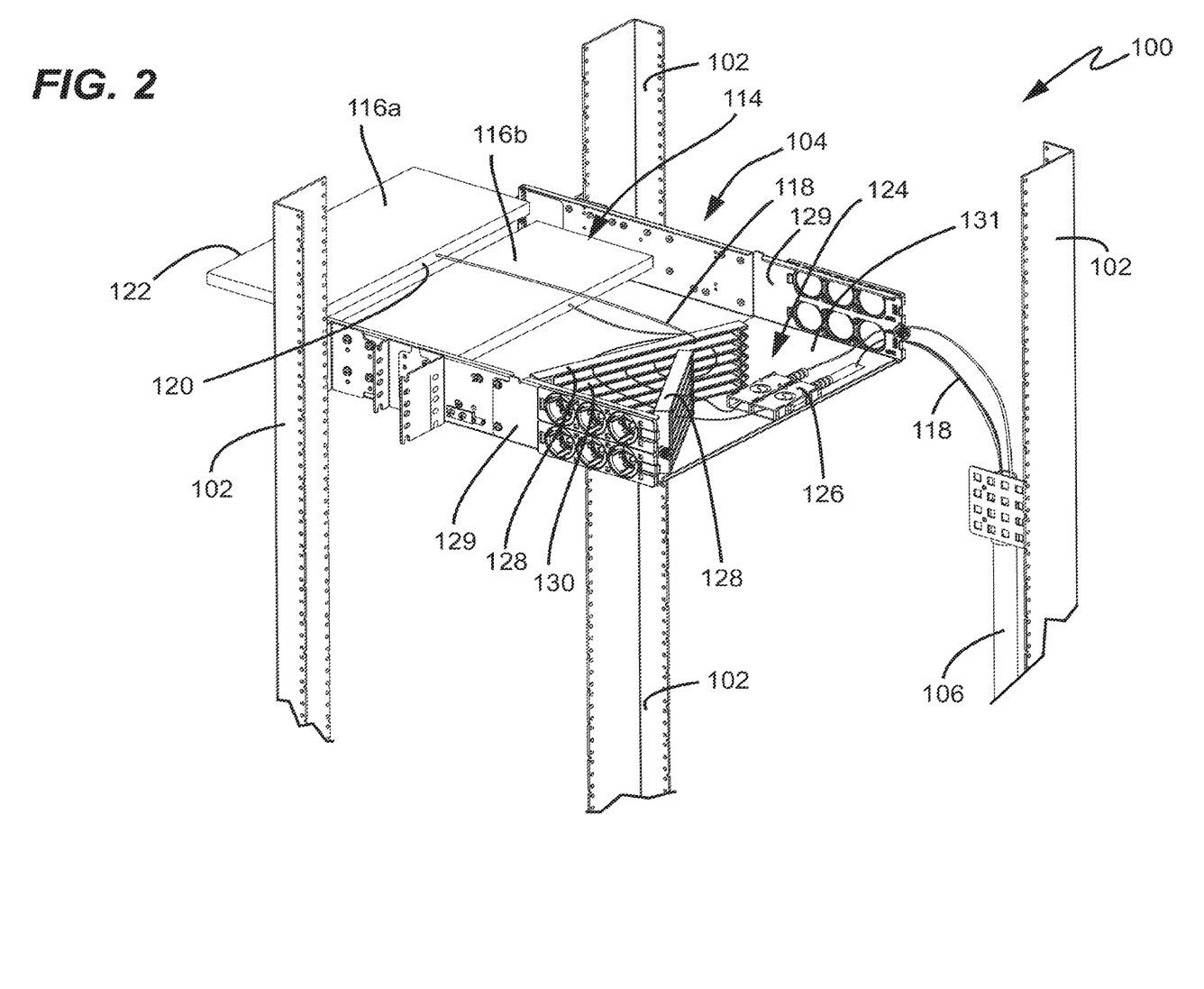
FIG. 2 is a perspective view of the telecommunications environment of FIG. 1 with at least one telecommunications component extended away from a chassis.
Figure 3:
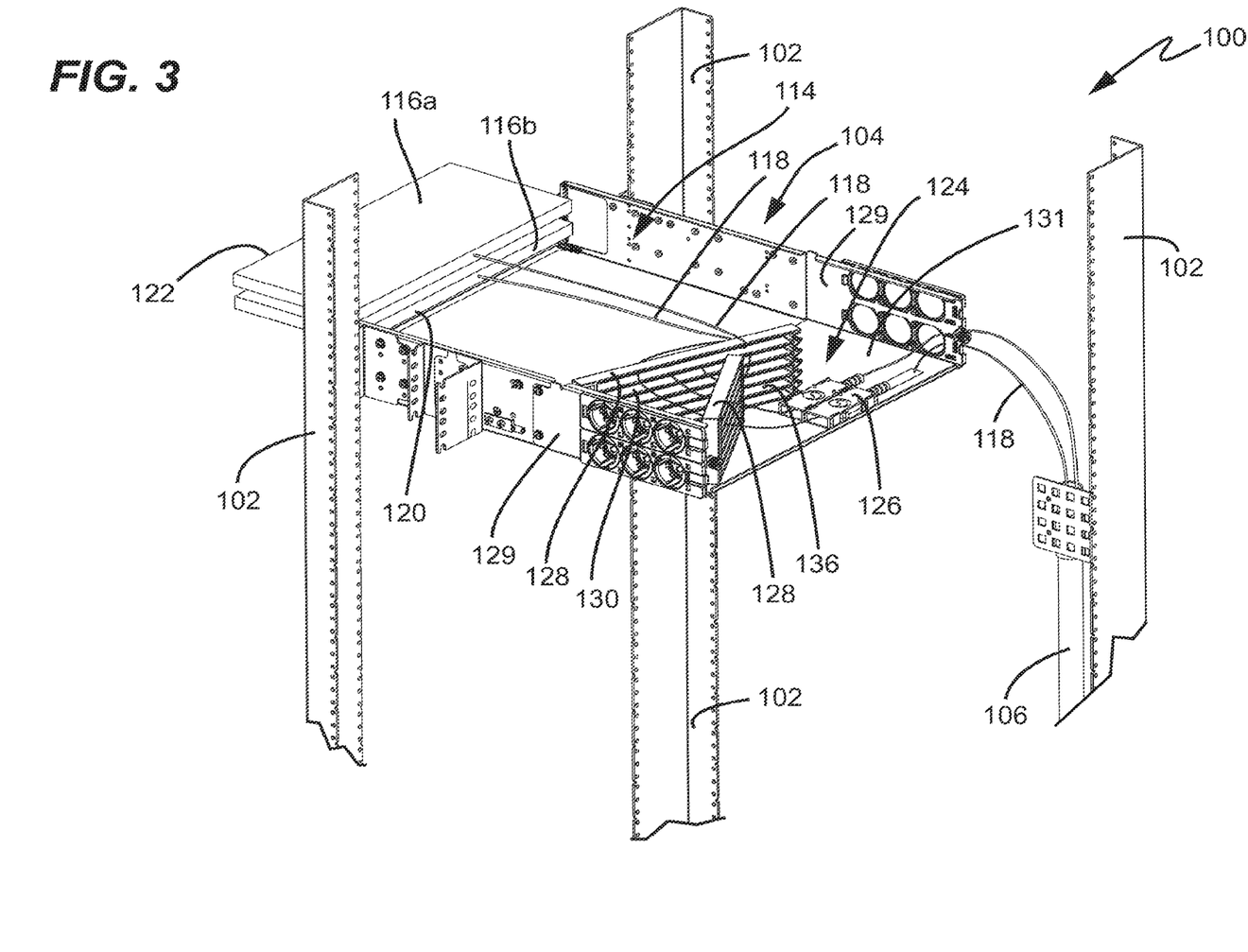
FIG. 3 is a perspective view of the telecommunications environment of FIG. 1 with at least two telecommunications components extended away from a chassis.

In the depicted examples, the telecommunications components 116 within the chassis 104 are trays that are in a vertical stack and configured where each tray can be individually slid out away from the chassis 104 for access. FIG. 1 shows the telecommunications components 116 stacked in a stored position. FIG. 2 shows the uppermost telecommunications component 116a extended away from the chassis 104. FIG. 3 shows the uppermost and lowermost telecommunications components 116a, 116b extended away from the chassis 104. While only a pair of telecommunications components 116 are shown, the chassis 104 can include a wide variety of numbers of telecommunications components 116. For example, the chassis 104 can include more than two telecommunications components 116. In some examples, the chassis 104 only includes a single telecommunications component 116. In some examples, each telecommunications component 116 is attached to at least one optical fiber contained within furcation tubes 118 of the cable 106 at a back side 120, opposite a front side 122. In other examples, the telecommunications components 116 can be other types of telecommunications components 116 that are movable with respect to the chassis 104.

The cable 106 includes a plurality of optical fibers. Each furcation tube 118 includes at least one optical fiber. In some examples, each furcation tube 118 can contain more than one optical fiber. In some examples, the cable 106 includes a fanout device 126 configured to break out the plurality of optical fibers contained within the cable 106 and position the optical fibers within the furcation tubes 118. In the depicted examples, the fanout device 126 is positioned inside the chassis at the second internal area 124. In some examples, the fanout device 126 is positioned outside of the chassis 104.

The furcation tubes 118 protect the optical fibers. The lengths of the furcation tubes 118 are variable and may be different than shown, with respect to a particular use. In some examples, at least portions of the furcation tubes 118 are flexible (e.g., they can include a polymeric tubing), so a technician can direct them to selected functions. Each of the furcation tubes 118 can be adapted to an individual optical fiber or a plurality of optical fibers, such as in the case of ribbon cables. In some examples, the number of furcation tubes 118 is selected to correspond to the number of optical fibers being routed from a cable 106.

In some examples, the furcation tubes 118 terminate at a connector. In some examples, the connectors are in the form of LC, SC (single fiber), and/or MPO (multiple fibers) connectors. In some examples, the connectors are positioned on the telecommunications component 116. In some examples, the connectorized furcation tubes 118 can be plugged into corresponding connectors/adapters and/or stored for future use.

A pair of freestanding cable guides 128 are shown positioned on a base surface 131 at the second internal area 124. In some examples, the cable guides 128 can have different configurations. In some examples, the cable guides 128 are substantially similar. As depicted, the cable guides 128 are positioned at angles with respect to walls 129 of the chassis 104. Depending on the application, the angles that the cable guides 128 are positioned with respect to the walls 129 can change. The cable guides 128 are freestanding and movable within the chassis 104 and aid in organizing the furcation tubes 118 attached to the telecommunications components 116. For example, when a telecommunications component 116 is moved away (e.g., slid out) away from the chassis 104 (see FIGS. 2 and 3) the cable guides 128 help to reduce opportunity for the attached furcation tubes 118 to become tangled with the other furcation tubes 118 within the chassis 104 that are not associated with the moved telecommunications component 116. In some examples, only a single cable guide 128 is utilized. In some examples, more than two cable guides 128 are utilized. If desired, the cable guide 128 can be fixed permanently or temporarily.

Each cable guide 128 includes at least one cable channel 130 through which furcation tubes 118 that correspond to a telecommunications component 116 can be routed. In some examples, each cable channel 130 corresponds with a separate telecommunications component 116. In some examples, each cable channel 130 can be configured to house furcation tubes 118 that correspond to a telecommunications component 116 at substantiality the same height of the cable channel 130. For example, a lowermost cable channel 130 can house furcation tubes 118 that correspond with a lowermost telecommunications component 116, while a highermost cable channel 130 can house furcation tubes 118 that correspond with a highermost telecommunications component 116. As shown in FIGS. 1-3, the furcation tubes 118 within each cable channel 130 move and slide within their respective cable channel 130 as telecommunications components 116 are moved with respect to the chassis 104. By allowing for movement of the furcation tubes 118 within the cable channel 130, the furcation tubes 118 are less likely to impact the sliding movement of the telecommunications components 116.

Figure 4:
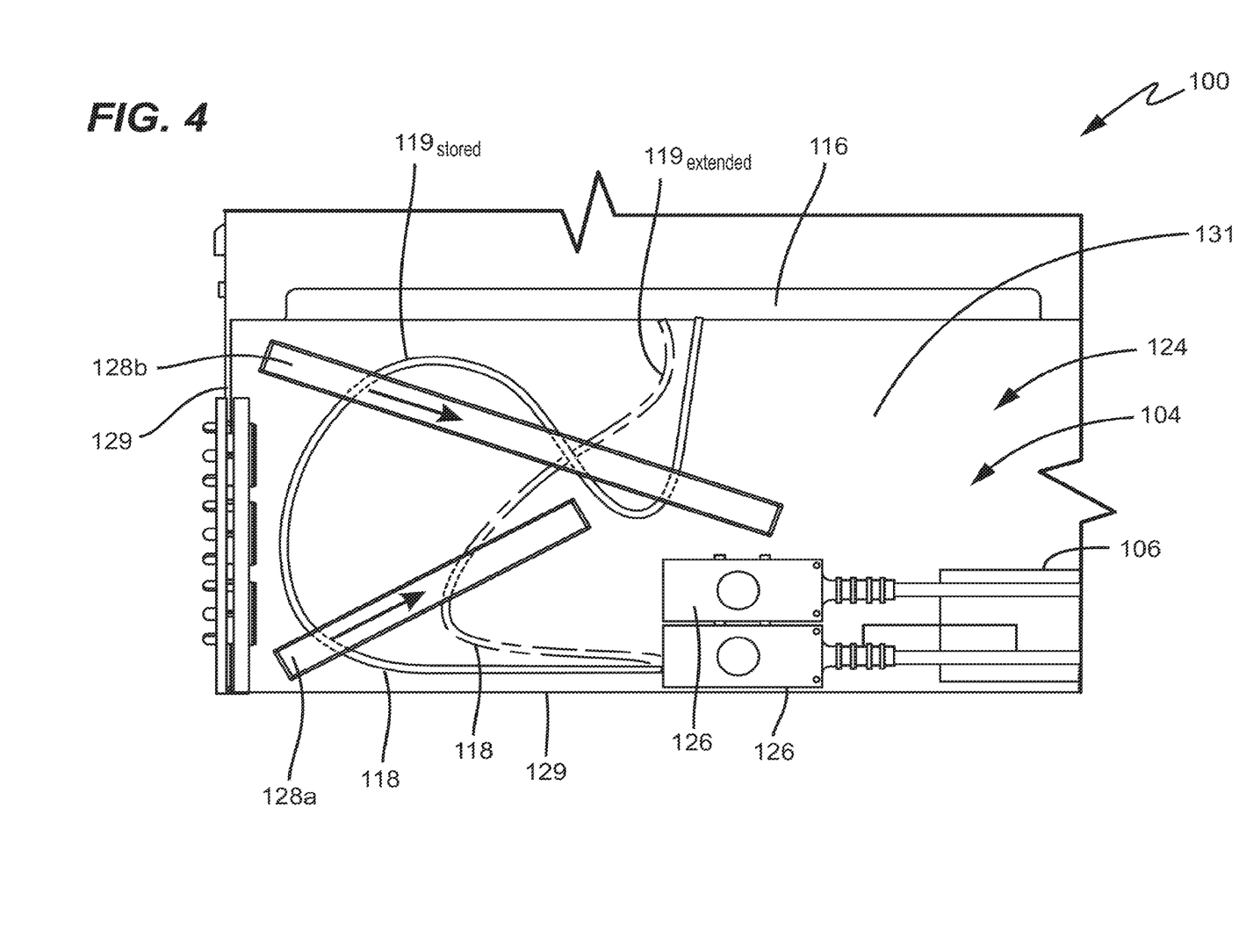
FIG. 4 is a schematic top view of the inside of the chassis including a pair of cable guides of the telecommunications environment of FIG. 1.

FIG. 4 shows a top schematic view of the telecommunications environment 100. The pair of cable guides 128a, 128b are positioned on the base surface 131 of the chassis 104. As noted above, the cable guides 128a, 128b are positioned at an angle with the walls 129 of the chassis 104. The cable guides 128a, 128b can be positioned in a variety of different positions at the second internal area 124. Further, in some examples, the guide cables 128a, 128b are configured to move within the chassis 104 to adjust to the furcation tubes 118 natural routing. This prevents the furcation tubes 118 from being forced into a position within the chassis 104 that may damage the furcation tubes 118. As shown, fanout devices 126 are positioned within the chassis 104.

Two separate intermediate cable positions are schematically shown in FIG. 4. The furcation tube 118 is in a first position $119_{stored}$ within the chassis 104 when a telecommunications component 116 to which the furcation tube 118 is attached is in a stored, non-extended position. The furcation tube 118 is in a second position $119_{extended}$ within the chassis 104 when the telecommunications component 116 to which the furcation tube 118 is attached is extended away from the chassis 104.

When the telecommunications component 116 is stored, the furcation tube 118 is positioned in the first position $119_{stored}$ within its respective cable channel 130 of the cable guide 128a, 128b to accommodate any extra slack in the furcation tube 118. In some examples, the furcation tubes 118 can be looped within each cable channel 130. Each cable channel 130 is separated from the other cable channels 130 in each cable guide 128a, 128b; therefore, while the furcation tube 118 can move within the cable channel 130, it cannot move out of the cable channel 130 in which it is positioned.

When the telecommunications component 116 is extended (e.g., slid outwardly), the furcation tube 118 slides and extends with the telecommunications component 116. As the telecommunications component 116 extends, furcation tube 118 moves (as indicated by arrows). As noted above, the cable channel 130 that the furcation tube 118 is positioned within can be substantially at the same height as the telecommunications component 116.

Figure 5:
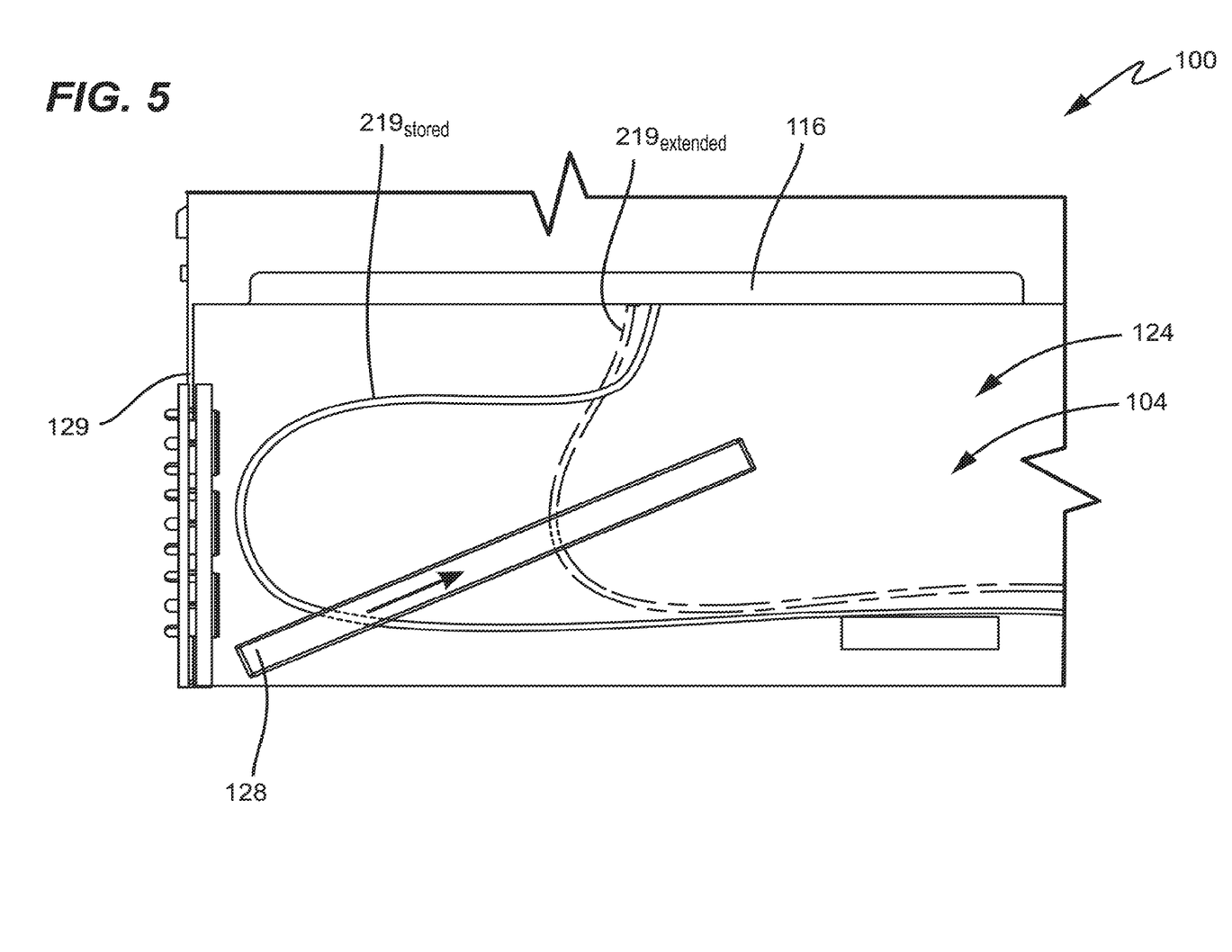
FIG. 5 is a schematic top view of the inside of the chassis including a single cable guide of the telecommunications environment of FIG. 1.

FIG. 5 shows a single cable guide 128 positioned on the base surface 131 of the chassis 104. Like in FIG. 4, the furcation tube 118 has a first position $219_{stored}$ within the chassis 104 when a telecommunications component 116 to which the furcation tube 118 is attached is in the stored, non-extended position and a second position $219_{extended}$ within the chassis 104 when the telecommunications component 116 to which the furcation tube 118 is attached is in an extended position.

Figure 6:
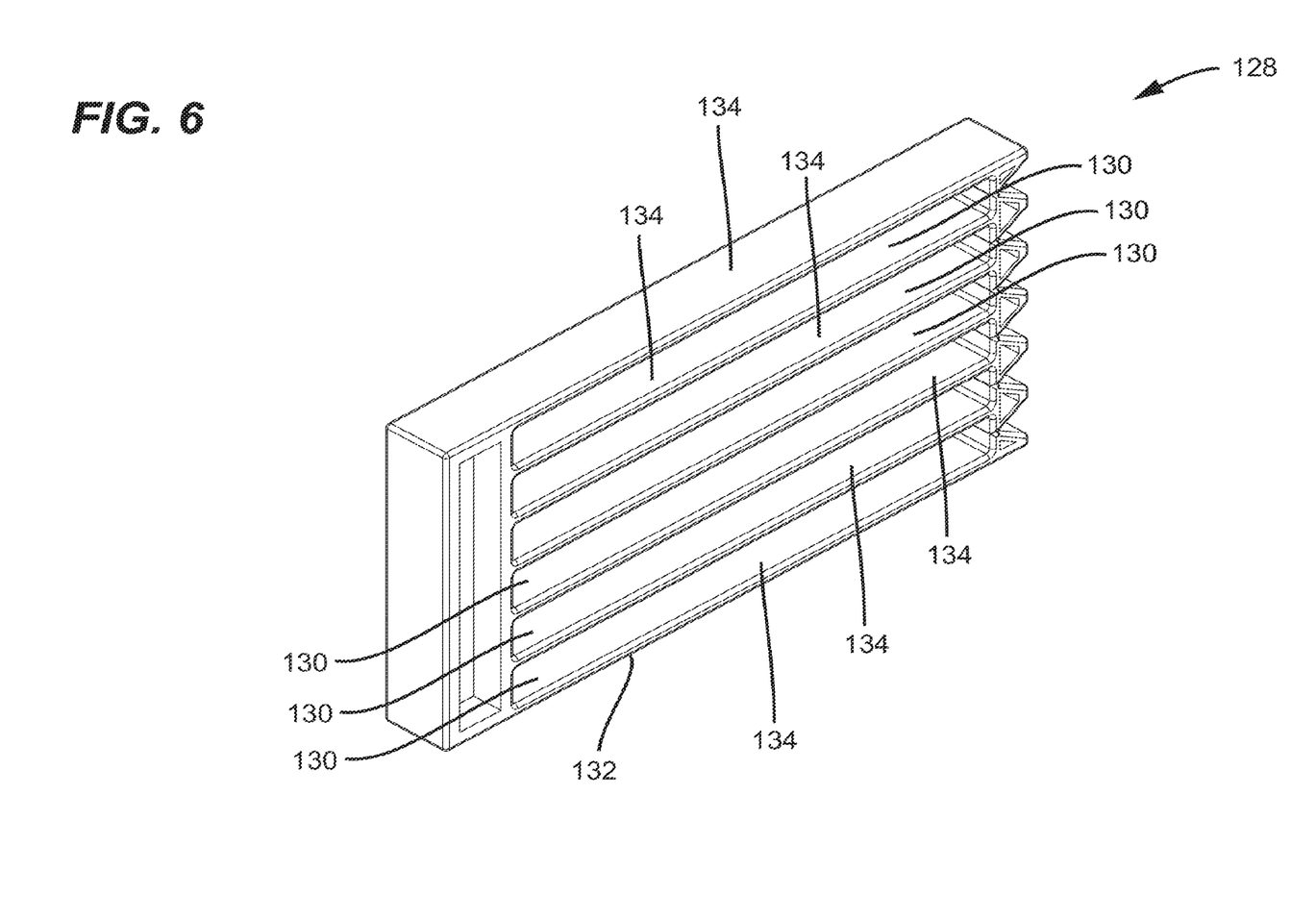
FIG. 6 is a perspective view of the cable guide, according to one example of the present disclosure.
Figure 7:
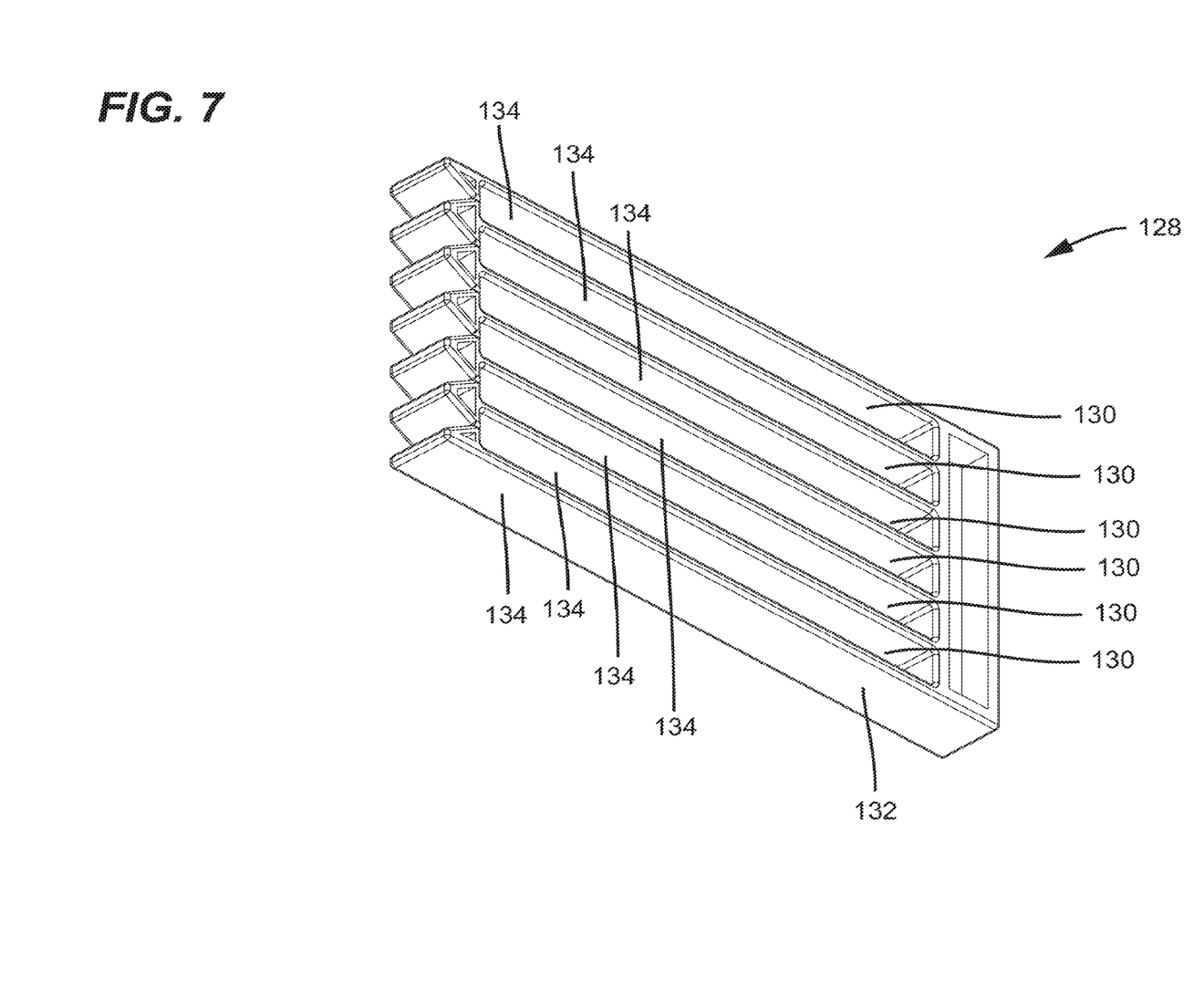
FIG. 7 is another perspective view of the cable guide of FIG. 6.

FIGS. 6 and 7 show the cable guide 128. The cable guide 128 includes a base 132, a plurality of arms 134, and the plurality of cable channels 130 defined by the arms 134. The cable guide 128 includes an arm support extending in an upwards direction from the base 132 and the plurality of arms 134 extend from the arm support and stacked above the planar base 132.

The base 132 is for positioning the cable guide 128 on the base surface 131 of the second internal area 124 of the telecommunications chassis 104. To facilitate positioning the cable guide 128 in a freestanding, upright manner, the base 132 is generally planar. In some examples, for stability, the base 132 is wider than the remaining cable guide 128. In some examples, the base 132 is formed by an arm 134. In some examples, the base 132 can include mounting features that cooperate with corresponding mounting features of the base surface 131.

The plurality of arms 134 define the plurality of cable channels 130. In some examples, to facilitate inserting furcation tubes 118 within the cable channels 130, at least one arm 134 is flexible. In some examples, the arms 134 are rigid and not flexible. In some examples, the arms 134 include a hinge so that access to the cable channels can be gained by moving the position of the hinge. In the depicted examples, each arm 134 is flexible. In some examples, the arms 134 are constructed of an elastic material so as to return back to a generally straight position once the arms are not flexed.

The plurality of cable channels 130 are each configured to receive a plurality of furcation tubes 118. Each of the plurality of cable channels 130 is configured to allow furcation tubes 118 to move within each of the plurality of channels 130. In some examples, the walls of the cable channels 130 are configured to allow unencumbered movement of the furcation tubes 118 within the cable channel 130. The furcation tubes 118 are not fixed within the cable channels 130 and are restricted from moving by the boundaries set by the arms 134. While six cable channels 130 are shown, the cable guide 128 can have more or less cable channels 130 depending on the application. It is considered within the scope of the present disclosure, that the cable channels 130 can have a variety of different sizes, shapes, and configurations.

Figure 8:
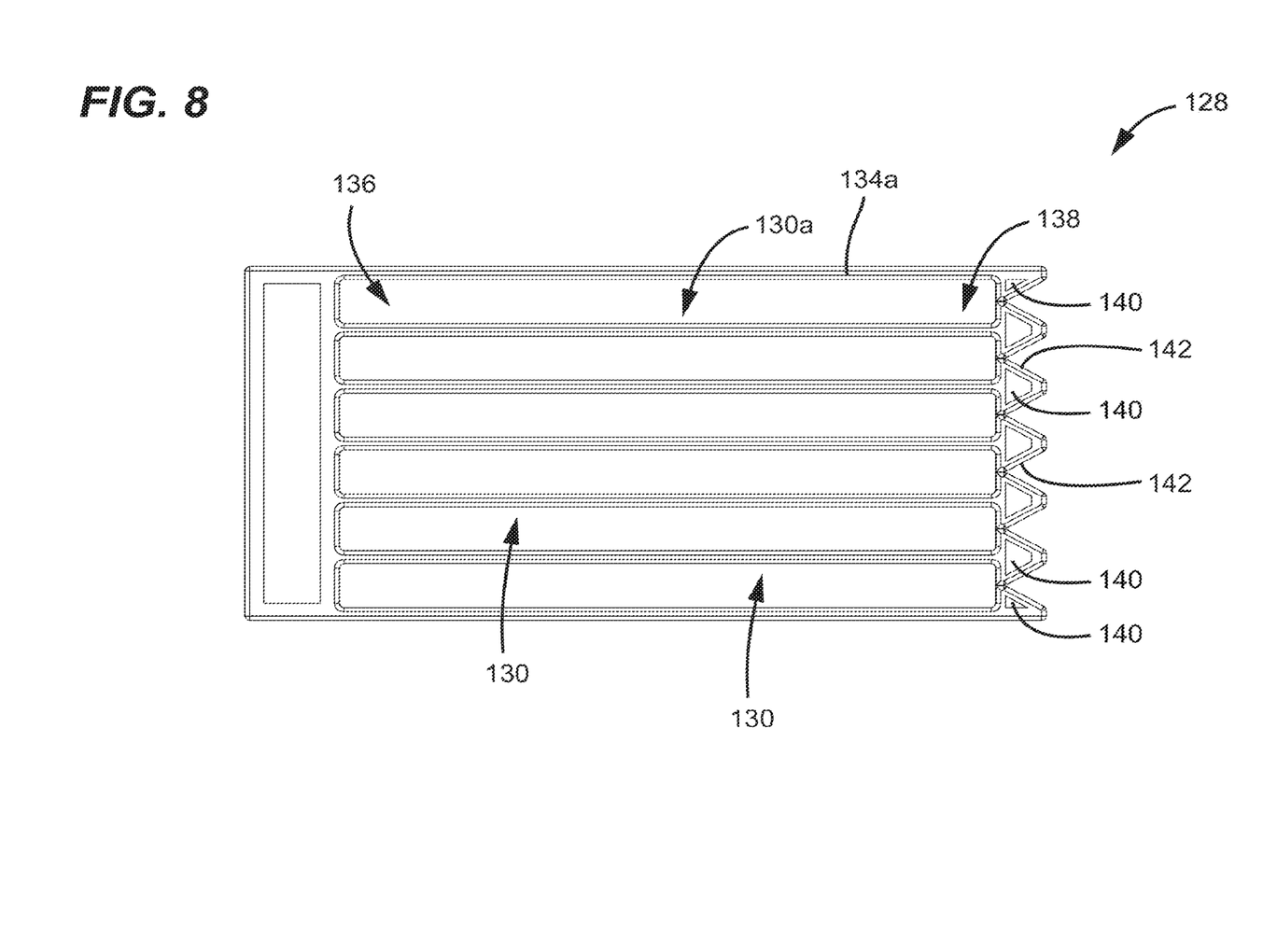
FIG. 8 is a front view of the cable guide of FIG. 6 with all cable channels in the closed position.
Figure 9:
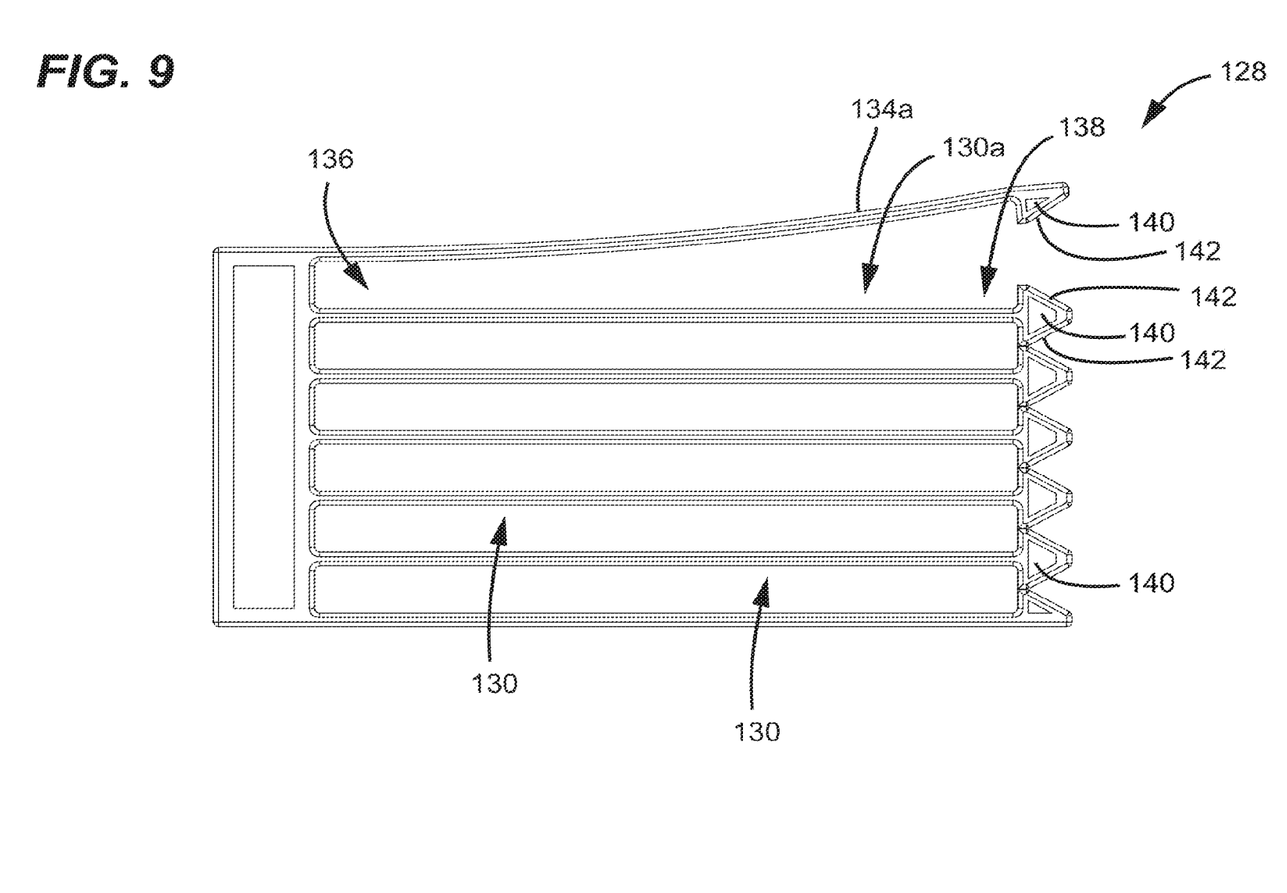
FIG. 9 is a front view of the cable guide of FIG. 6 with at least one cable channel in the open position.

FIG. 8 shows the cable guide 128 with all the cable channels 130 in a closed position. FIG. 9 shows one arm 134a flexed and the respective cable channel 130a in the open position. When in the open position, furcation tubes 118 can be loaded and unloaded into and out of the cable channel 130. When in the closed position, furcation tubes 118 are resisted from being removed from the cable channel 130.

Each cable channel 130 has a first end 136 and a second end 138. In some examples, each channel 130 is openable at the second end 138. In some examples, each cable channel 130 is openable between the first end 136 and the second end 138. In some examples, each cable channel 130 is closed by a closure device 140. In the depicted example, the closure device 140 is integrally formed with each arm 134 and configured to close off each cable channel 130 when each arm 134 is not flexed. In some examples, the closure device 140 of each arm 134 can be utilized to close multiple cable channels 130. In the some examples, the closure device can have ramped surfaces 142 to facilitate operation of the closure device 140. The closure device 140, in some examples, can be separate from the arms 134.

During loading and unloading of the cable guides 128, because the cable guides 128 are freestanding, the user can easily remove the cable guides 128 from the chassis 104 and load the cable channels 130 with furcation tubes 118. This can be done by opening the cable channels, loading or unloading the furcation tubes 118 into/out of the cable channel 130, and closing the cable channel 130. In the example shown, the arms 134 can be flexed so as to open the cable channels 130 to facilitate loading and unloading the furcation tubes 118 within the cable channels 130. As noted above, the user can load furcation tubes 118 into a cable channel 130 that generally corresponds to the same height as the telecommunications component 116 to which the loaded furcation tubes 118 are attached.

Figure 10:
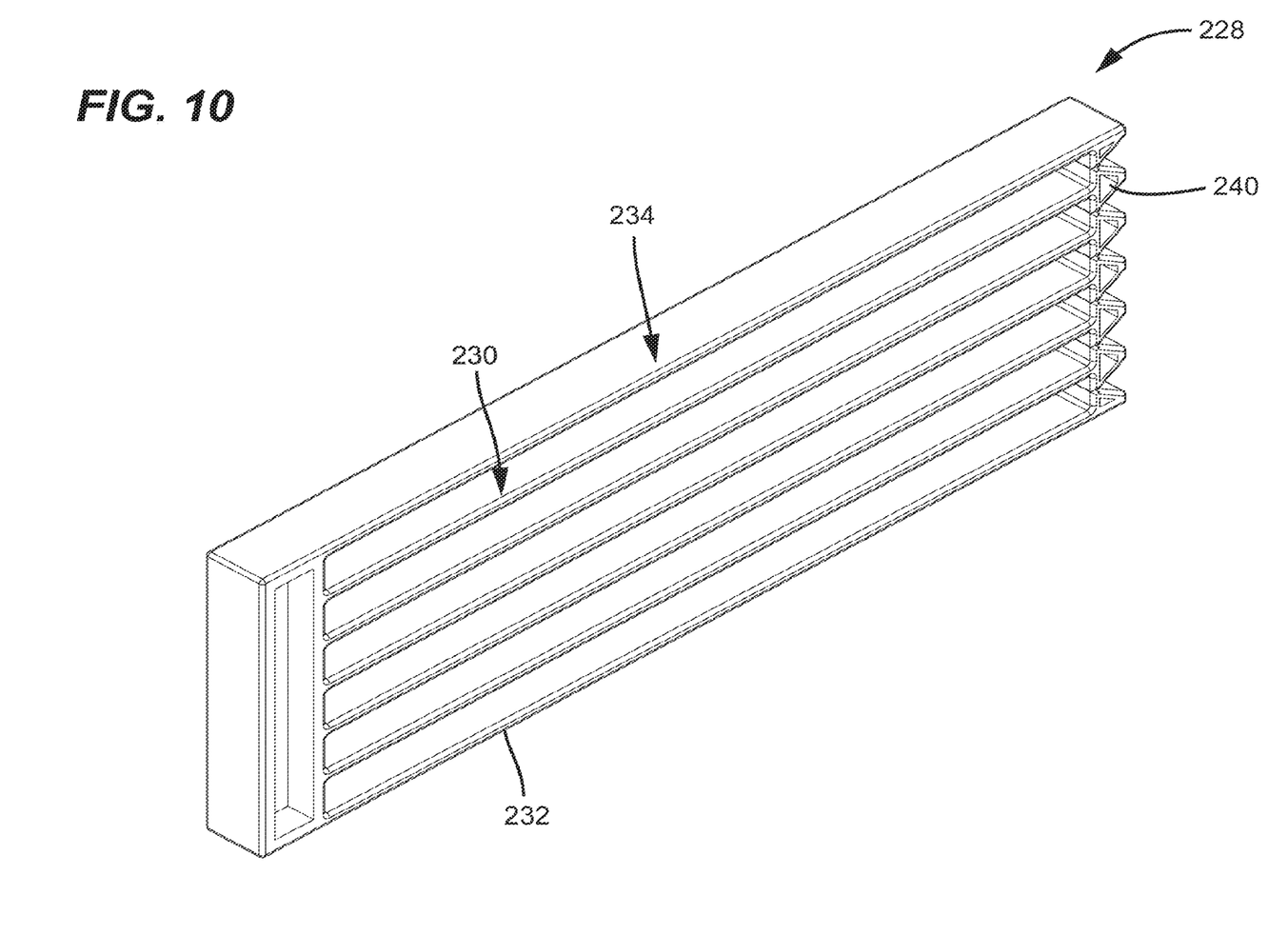
FIG. 10 is a perspective view of the cable guide, according to one example of the present disclosure.
Figure 11:
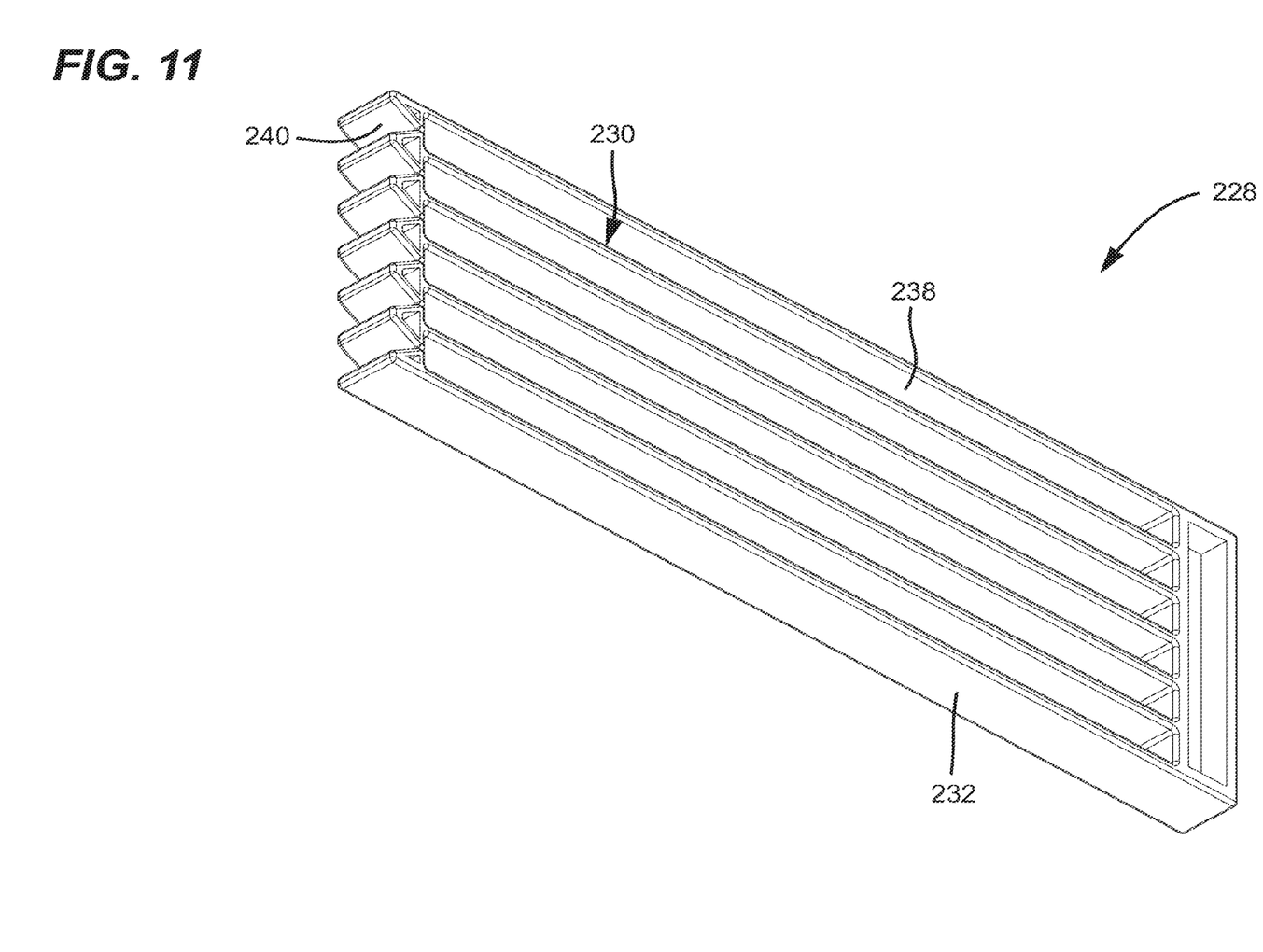
FIG. 11 is another perspective view of the cable guide of FIG. 10.
Figure 12:
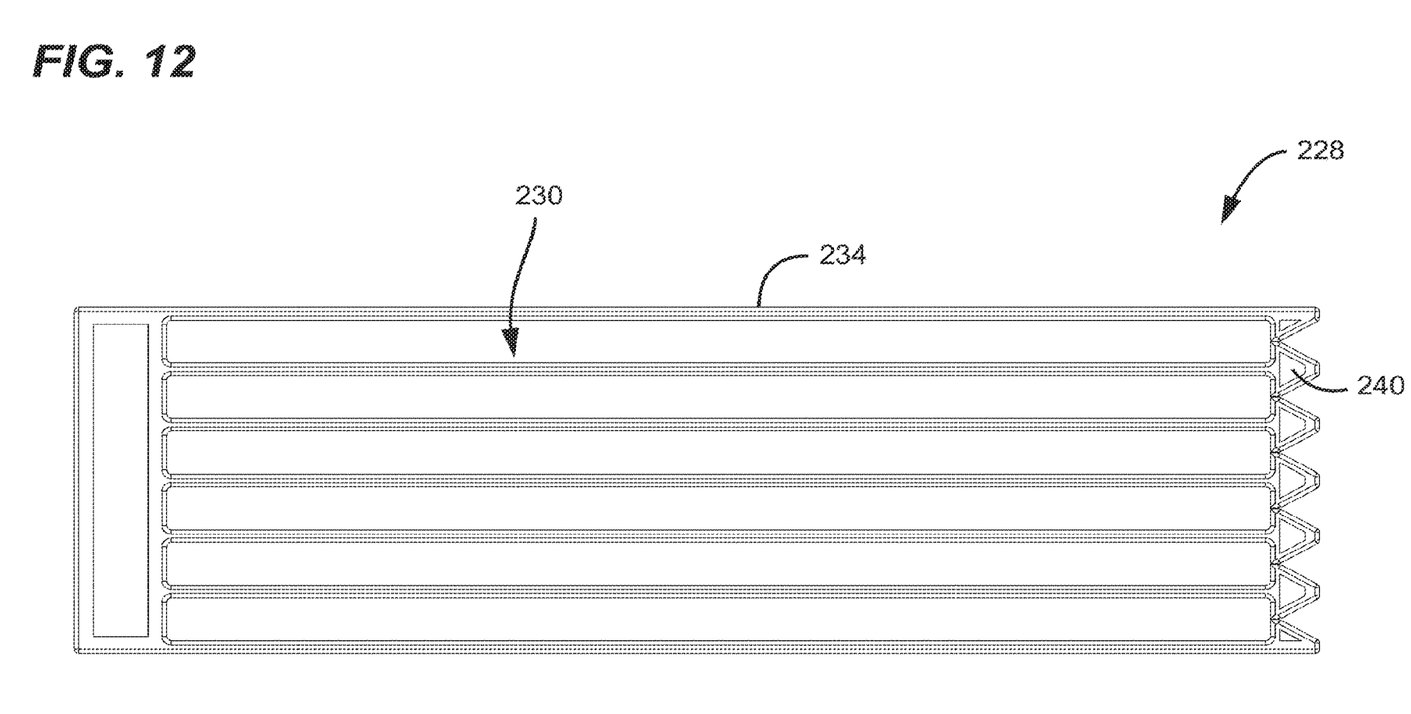
FIG. 12 is a front view of the cable guide of FIG. 10 with all cable channels in the closed position.

FIGS. 9-11 show a cable guide according to another example of the present disclosure. The cable guide 228 is substantially similar to the cable guide 128, described above. As shown, the cable guide 228 is longer than the cable guide 128. Like cable guide 128, the cable guide 228 includes a plurality of channels 230, a base 232, a plurality of arms 234, and a plurality of closure devices 240.

The cable guides are usable with a variety of cables including single fiber and multi-fiber, such as ribbon cables. The cables can be broken out from a fanout. The cables may or may not be covered by a furcation tube. The Cables used with the cable guides tend to not bunch up with other cables, or not get caught on other cables, when only a select number of the cables to be moved as part of operation of the telecommunications equipment, such as by sliding or rotating a select tray from a group of trays.

If the cables are allowed to bunch up or cross over each other, the movable tray may be harder to move if other cables are catching or blocking the cables that are part of the movable tray. The cable guides disclosed herein prevent the bunch up or crossing over of the different horizontal layers of trays and their respective cables.

By allowing the cable guide to be placed in selected locations, the user can optimize the management or separation of the cables in those areas where the cables tend to bunch up or cross over in the equipment where the movable trays are provided.

EXAMPLES

Examples of the disclosure are reflected in the below-listing of examples, as well as the claims included herein.

In Example 1, a telecommunications system comprises a cable including a plurality of optical fibers and a chassis having a first internal area and a second internal area, the second internal area having a base surface. The telecommunications system further includes a cable guide on the base surface of the second internal area of the chassis, the cable guide defining at least one cable channel, the cable being positioned, and movable, within the at least one cable channel. The at least one cable channel has an open position, where access to the at least one cable channel is allowed, and a closed position, where access to the at least one cable channel is restricted. The telecommunications system includes a telecommunications component positioned at the first internal area of the chassis, the telecommunications component being attached to the cable, the telecommunications component being movably mounted to the chassis between a first position and a second position. When the telecommunications component is moved between the first and second positions, the cable moves within the at least one cable channel of the cable guide.

In Example 2, the telecommunications system of Example 1 is modified in that the cable includes at least one furcation tube positionable in the cable channel of the cable guide.

In Example 3, the telecommunications system of Examples 1 and 2 is modified to further include a fanout device configured to position the plurality of optical fibers of the cable within a plurality furcation tubes, wherein at least one optical fiber is positioned within a single furcation tube.

In Example 4, the telecommunications system of Examples 1-3 is modified in that the fanout device is positioned in the chassis.

In Example 5, the telecommunications system of Examples 1-4 is modified in that the fanout device is positioned at the second internal area of the chassis.

In Example 6, the telecommunications system of Examples 1-5 is modified in that the fanout device is positioned outside of the chassis.

In Example 7, the telecommunications system of Examples 1-6 is modified in that the telecommunications component is a telecommunications tray that can be slid out, away from the chassis.

In Example 8, the telecommunications system of Examples 1-7 is modified to further include a plurality of the telecommunications components, and the cable guide includes a plurality of cable channels, each cable channel of the plurality of cable channels corresponding with at least one of the plurality the telecommunications components.

In Example 9, the telecommunications system of Examples 1-8 is modified in that the cable guide includes a base for mounting the cable guide in the chassis.

In Example 10, the telecommunications system of Examples 1-9 is modified in that the cable guide includes a plurality of arms defining a plurality of cable channels including the at least one cable channel, wherein at least one arm of the plurality of arms is flexible.

In Example 11, the telecommunications system of Examples 1-10 is modified in that the plurality of cable channels are each configured to receive a group of a plurality of furcation tubes of the cable. Each group of the plurality of furcation tubes is configured to move within each of the plurality of cable channels. Each of the plurality of cable channels has an open and a closed position, wherein when in the open position, the group of the plurality of furcation tubes can be loaded and unloaded into and out of each of the plurality of cable channels, and wherein when in the closed position, the group of the plurality of furcation tubes is restricted from being removed from each of the plurality of cable channels.

In Example 12, the telecommunications system of Examples 1-11 is modified in that the cable guide is a first cable guide, and the telecommunications system further includes a second cable guide positioned on, and movable on, the base surface of the second internal area of the chassis adjacent the first cable guide, the second cable guide being unmounted to the chassis, the second cable guide defining at least one cable channel, the cable being positioned, and movable, within the at least one cable channel of the second cable guide. The at least one cable channel of the second cable guide has an open position, where access to the at least one cable channel of the second cable guide is allowed, and a closed position, where access to the at least one cable channel of the second cable guide is restricted.

In Example 13, the telecommunications system of Example 12 is modified in that the first and second cable guides are positioned at an angle with respect to side walls of the chassis.

In Example 14, the telecommunications system of Examples 1-13 is modified in that at least one of the first and second cable guides is positioned at an angle with respect to side walls of the chassis.

In Example 15, a cable guide comprises a base for positioning the cable guide on a base surface of an internal area of a telecommunications chassis, the base being generally planar; a plurality of arms wherein at least one arm of the plurality of arms is flexible; and a plurality of cable channels defined by the plurality of arms, the plurality of cable channels each receiving a plurality of furcation tubes, each of the plurality of cable channels being configured to allow furcation tubes to move within each of the plurality of cable channels. Each cable channel has an open position and a closed position, wherein, when in the open position, furcation tubes can be loaded and unloaded into and out of the cable channel, wherein when in the closed position, furcation tubes are restricted from being removed from the cable channel.

In Example 16, the cable guide of Example 15 is modified in that the plurality of furcation tubes positioned within each of the plurality of cable channels form a group of furcation tubes, wherein each group of furcation tubes corresponds with a sliding telecommunications component mounted within the telecommunications chassis.

In Example 17, the cable guide of Examples 15 and 16 is modified in that each of the plurality of cable channels has a first end and a second end, wherein each of the plurality of cable channels is openable at the second end.

In Example 18, the cable guide of Examples 15-17 is modified in that each of the plurality of cable channels is openable by flexing an arm of the plurality of arms that define each of the plurality of cable channels.

In Example 19, the cable guide of Examples 15-18 is modified in that each of the plurality of cable channels is openable by moving a closure device positioned at the second end.

In Example 20, the cable guide of Examples 15-19 is modified in that the closure device of each of the plurality of cable channels is integrally formed in each arm of the plurality of arms.

In Example 21, the cable guide of Examples 15-20 is modified in that each of the plurality of cable channels is biased to the closed position.

In Example 22, a method of using telecommunications equipment comprises opening a cable channel of a cable guide; loading a plurality of furcation tubes, each containing at least one optical fiber, within the cable guide; closing the cable channel; positioning the cable guide on a base surface of an internal area of a telecommunications chassis; and moving the plurality of furcation tubes within the cable channel by moving a telecommunications component attached to the plurality of furcation tubes.

In Example 23, the method of Example 22 is modified in that the cable guide is positioned at an angle with respect to side walls of the telecommunications chassis.

In Example 24, the method of Examples 22 is modified in that the cable is freestanding on the base surface of the internal area of the telecommunications chassis.

In Example 25, the system, device, or method of any of Examples 1-24 is modified in that the cable guide or guides are free standing.

In Example 26, the system, device, or method of any of Examples 1-24 is modified in that the cable guide or guides are attachable to telecommunications equipment, such as the chassis.

In Example 27, the system, device, or method of any of Examples 1-24 is modified in that the telecommunications equipment, such as the chassis, has multiple horizontal rows with separately movable telecommunications components, and the cable guide or guides have a corresponding number of channels.

In Example 28, the system, device, or method of any of Examples 1-27 is modified in that the cable guide or guides are positioned at non-parallel angles relative to a front, a side, or a rear of the telecommunications equipment, such as the chassis.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A telecommunications system comprising:
a cable including a plurality of optical fibers;
a chassis having a first internal area and a second internal area, the second internal area having a base surface;
a cable guide having a planar base, the planar base disposed on the base surface of the second internal area of the chassis such that the cable guide is freestanding on the base surface, the cable guide movable within the second internal area of the chassis with the planar base slidable along the base surface, the cable guide defining at least one cable channel disposed above the planar base, the cable being positioned, and movable, within the at least one cable channel, wherein the at least one cable channel has an open position, where access to the at least one cable channel is allowed, and a closed position, where access to the at least one cable channel is restricted; and
a telecommunications component positioned at the first internal area of the chassis, the telecommunications component being attached to the cable, the telecommunications component being movably mounted to the chassis between a first position and a second position, wherein, when the telecommunications component is moved between the first and second positions, the cable moves within the at least one cable channel of the cable guide.

2. The telecommunications system of claim 1, wherein the cable includes at least one furcation tube positionable in the at least one cable channel of the cable guide.

3. The telecommunications system of claim 1, further comprising a fanout device configured to position the plurality of optical fibers of the cable within a plurality furcation tubes, wherein at least one optical fiber is positioned within a single furcation tube.

4. The telecommunications system of claim 3, wherein the fanout device is positioned at the second internal area of the chassis.

5. The telecommunications system of claim 3, wherein the fanout device is positioned outside of the chassis.

6. The telecommunications system of claim 1, wherein the telecommunications component is a telecommunications tray that can be slid out, away from the chassis.

7. The telecommunications system of claim 1, further comprising a plurality of the telecommunications components, and wherein the cable guide includes a plurality of cable channels, each cable channel of the plurality of cable channels corresponding with at least one of the plurality of the telecommunications components.

8. The telecommunications system of claim 1, wherein the cable guide includes an arm support extending in an upwards direction from the planar base and a plurality of arms extending from the arm support and stacked above the planar base, the plurality of arms defining a plurality of cable channels including the at least one cable channel, wherein at least one arm of the plurality of arms is flexible.

9. The telecommunications system of claim 8, wherein the plurality of cable channels are each configured to receive a group of a plurality of furcation tubes of the cable, each group of the plurality of furcation tubes is configured to move within each of the plurality of cable channels, wherein each of the plurality of cable channels have an open position and a closed position, wherein when in the open position, the group of the plurality of furcation tubes can be loaded and unloaded into and out of each of the plurality of cable channels, wherein when in the closed position, the group of the plurality of furcation tubes is restricted from being removed from each of the plurality of cable channels.

10. The telecommunications system of claim 1, wherein the cable guide is a first cable guide, wherein the telecommunications system further includes a second cable guide positioned on, and movable on, the base surface of the second internal area of the chassis adjacent the first cable guide, the second cable guide being unmounted to the chassis, the second cable guide defining at least one cable channel, the cable being positioned, and movable, within the at least one cable channel of the second cable guide, wherein the at least one cable channel of the second cable guide has an open position, where access to the at least one cable channel of the second cable guide is allowed, and a closed position, where access to the at least one cable channel of the second cable guide is restricted.

11. The telecommunications system of claim 10, wherein the first and second cable guides are positioned at an angle with respect to side walls of the chassis.

12. The telecommunications system of claim 10, wherein at least one of the first and second cable guides is positioned at an angle with respect to side walls of the chassis.

* * * * *